Figure 1:
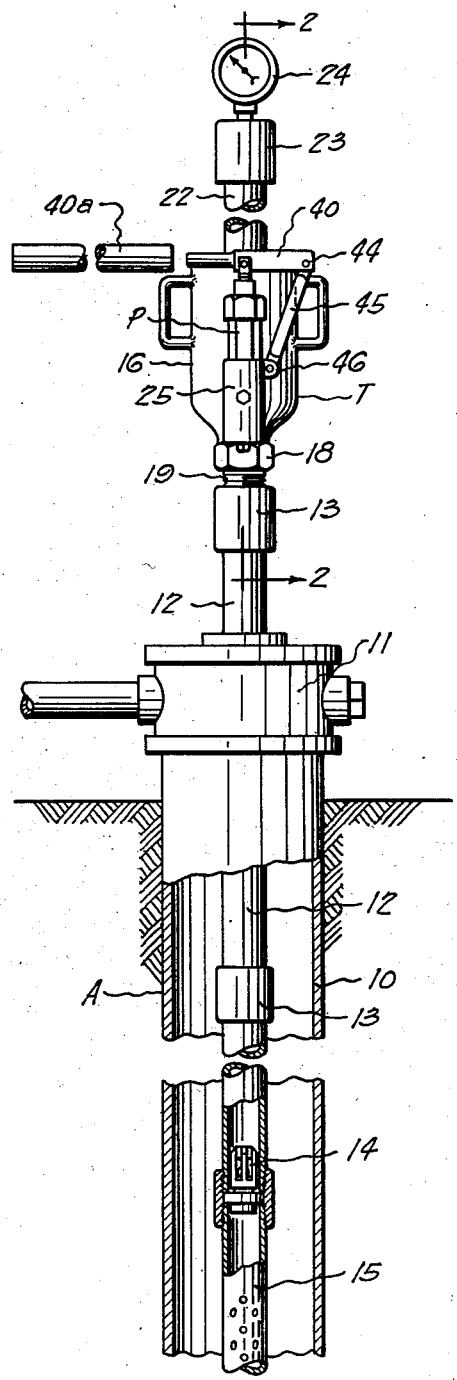

June 23, 1942.   C. H. BROWALL   2,287,340
METHOD OF AND MEANS FOR TESTING WELL TUBING
Filed Aug. 24, 1939   2 Sheets-Sheet 1

Inventor
Carl H. Browall
By Jack A. Athley
Attorney

June 23, 1942.　　C. H. BROWALL　　2,287,340
METHOD OF AND MEANS FOR TESTING WELL TUBING
Filed Aug. 24, 1939　　2 Sheets-Sheet 2

Inventor
Carl H. Browall
By Jack Ashly
Attorney

Patented June 23, 1942

2,287,340

UNITED STATES PATENT OFFICE 2,287,340

METHOD OF AND MEANS FOR TESTING
WELL TUBING

Carl H. Browall, Ada, Okla.

Application August 24, 1939, Serial No. 291,650

5 Claims. (Cl. 137—77)

This invention relates to new and useful improvements in methods of and means for testing well tubing.

As is well known, the well tubing extends axially through the well casing and is utilized as the production tube through which the well products are conducted to the surface of the well. The tubing string is made up of a plurality of sections which are coupled together by suitable coupling collars and it often occurs that said string develops a leak, either at one of the couplings or intermediate the ends of a section. Due to the length of the tubing string, it is most difficult to locate such leak and this is particularly true when the leak is small and is not visible when the tubing is removed from the well. In locating leakage in a tubing string, it has been the practice to "pull" the entire string, and as the tubing is removed, the same is observed in an effort to locate any leakage. The only pressure on the leak is the hydrostatic head of the fluid column above the leak, which column is limited to the height to which the tubing can be raised in the derrick. Therefore, the pressure is insufficient to force the fluid outwardly through the point of leakage, with the result that said point cannot be observed.

It is, therefore, one object of this invention to provide an improved method of and means for accurately testing well tubing for leaks, whereby the presence of a leak may be quickly and easily determined and its location ascertained.

An important object of the invention is to provide an improved apparatus for testing well tubing which is so constructed that it may be attached to the well tubing as the same is being run into or removed from the well bore and which is arranged so that the entire string is subjected to each test, rather than the individual section or sections immediately adjacent the apparatus, whereby an accurate test of all sections and joints may be simultaneously performed.

Another object of the invention is to provide an improved tubing tester having means for introducing a fluid under pressure into the well tubing while the same is supported in the well, whereby said fluid is added to the fluid column normally in the well, and the entire tubing string subjected to a sufficient pressure to disclose leakage.

A further object of the invention is to provide a testing device, of the character described, wherein a manually operated pump of improved construction is utilized to build up the pressure of the fluid introduced into the tubing; said pump including a pair of pistons of different sizes, which are arranged to operate as a unit to handle large volumes especially when considerable gas is present in the tubing, after which the smaller piston may be individually actuated to exert high fluid pressure on the tubing string for testing purposes.

Still another object of the invention is to provide an improved testing device, which will operate on a small amount of fluid, such as crude oil, lubricating oil, or other fluid readily available on a derrick floor, the device being readily handled by the usual elevators, whereby the tubing string may be raised and lowered while under pressure, which facilitates the testing operation.

A particular object of the invention is to provide an improved method of testing well tubing, which includes, subjecting the entire tubing string to a predetermined pressure to ascertain the presence of a leak in said string and then successively removing sections of the string and subjecting the remainder of the string to said pressure so as to accurately determine the exact location of the leak without the necessity of removing the entire string from the well bore.

A still further object of the invention is to provide a device, of the character described, wherein the presence of a leak in the tubing may be determined by a gauge which is associated with the device, whereby visual observation of the tubing is unnecessary.

A construction designed to carry out the invention will be hereinafter described, together with other features of the invention.

Figure 2:
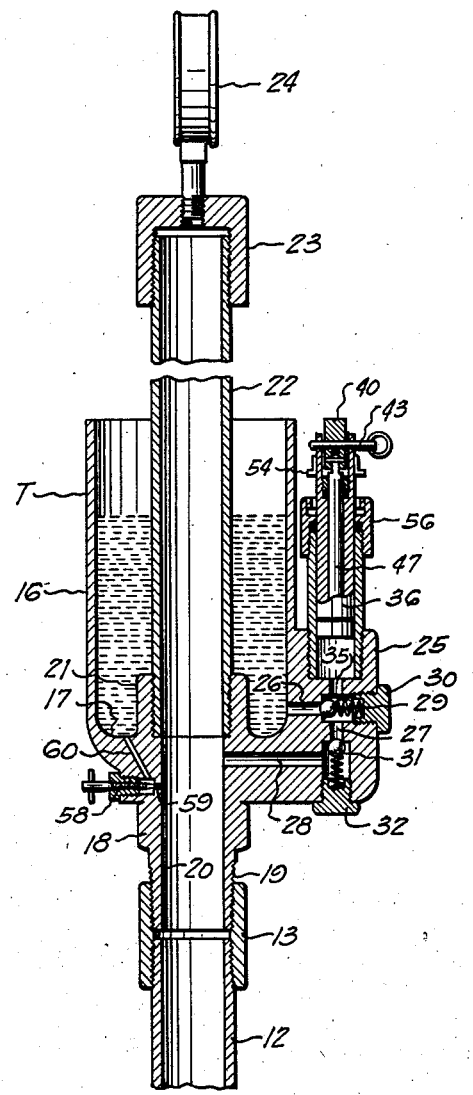
Figure 3:
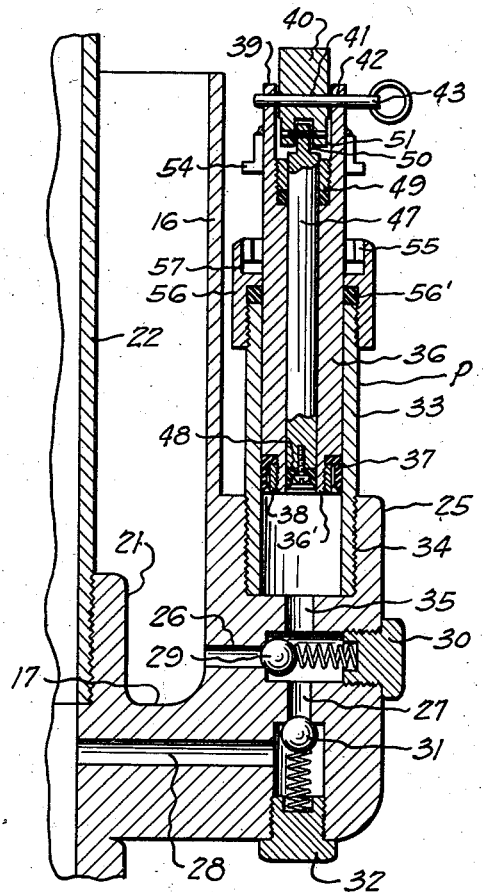
Figure 4:
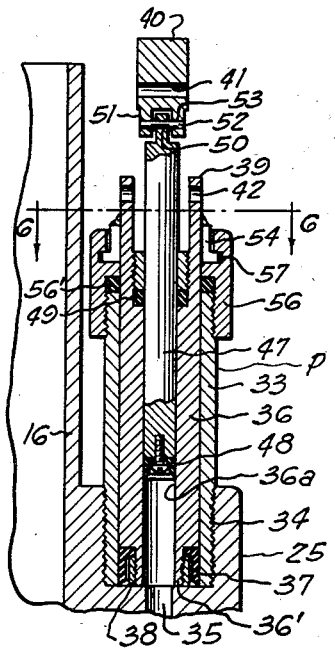

The invention will be more readily understood from a reading of the following specification and by reference to the accompanying drawings, in which an example of the invention is shown, and wherein:

Figure 1 is a view, partly in elevation and partly in section, of an improved tubing tester, constructed in accordance with the invention, and showing said tester applied to the well tubing, Figure 2 is an enlarged transverse, vertical, sectional view taken on the line 2—2 of Figure 1, Figure 3 is an enlarged transverse, vertical, sectional view of the pressure pump and illustrating the two pistons of said pump connected together and acting as a single piston, Figure 4 is a transverse, vertical, sectional view of the pump with the outer piston locked in a stationary position, whereby the inner piston may be individually operated.

Figure 6:
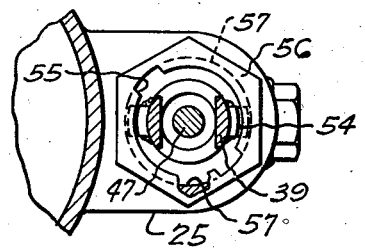
Figure 5:
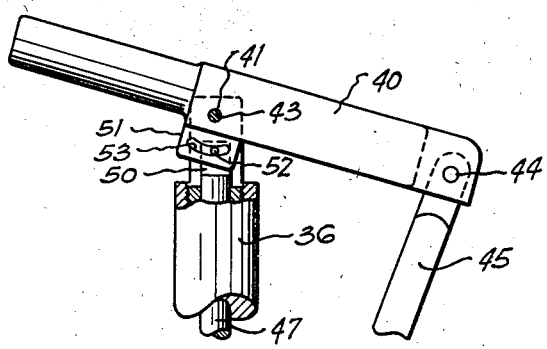

Figure 5 is an enlarged view, partly in elevation and partly in section, showing the connection between the pistons and the operating lever, and Figure 6 is a horizontal, cross-sectional view, taken on the line 6—6 of Figure 4.

In the drawings, the numeral 10 designates the usual well casing which extends downwardly through the well bore A. The upper end of the casing carries the usual casing head 11 and the well tubing 12 which is suitably suspended from the head 11 extends axially through the well casing in the usual manner. The well tubing is made up of a plurality of sections which are connected together by suitable coupling collars 13. A standing valve 14 is mounted in the lower end of the tubing and a well screen or perforated section of pipe 15 projects below said valve. As is well known, the well products flow into the well tubing past the standing valve 14 and upwardly to the tubing string to the surface. Ordinarily, a tubing head (not shown) is mounted on the upper end of the tubing and serves to connect said tubing with suitable outlet pipes which carry the well products to the various points of disposal or storage tank.

The tubing string 12 extends substantially throughout the length of the well bore, which may be several thousand feet, and in many instances a leakage might occur in some point in said string. This leakage may be caused by one of the sections of the tubing string being split, or it may occur at one of the joints or couplings 13. In order to test the tubing string to determine the presence of a leak therein, the improved tubing tester T is adapted to be coupled to the upper end of the tubing string, being substituted for the tubing head (not shown). The tubing tester T may be readily coupled to the uppermost collar 13 of the string, as is clearly shown in Figure 1.

The device T includes an annular body 16 which has a closed bottom 17 and an open top, as is clearly shown in Figure 2. An axially disposed nipple 18 is preferably made integral with the bottom 17 and depends therefrom, said nipple being formed with external screw threads 19. The screw threads are adapted to be received by the uppermost coupling collar 13 of the tubing string 12, whereby the body is connected to and supported by the tubing string. An axial bore or opening 20 extends vertically through the nipple 18 and the bottom 17 of the body and said bore is of substantially the same diameter as the bore of the well tubing 12 so as to form a continuation thereof. An upstanding collar 21 is preferably formed integral with the bottom 17 of the body and said collar surrounds the bore 20, being disposed within the interior of the body 16. A stand pipe 22 extends axially through the body and has its lower end threaded into the collar 21. The upper end of the stand pipe projects from the open upper end of the body 16 and is closed by a cap member 23, which cap has a suitable pressure gauge 24 mounted therein. By observing Figure 2, it will be seen that when the device T is mounted on the upper end of the tubing string 12, a communication is established between the bore of the well tubing and the stand pipe 22 through the axial bore or opening 20. Since the gauge 24 is mounted in the cap 23 secured to the upper end of the stand pipe 22, it will be evident that said gauge will register the pressure within the tubing 12. It is noted that a space is provided between the cap 23 and the top of the body, whereby the usual well elevators may be engaged around the stand pipe to permit the device to be readily raised or lowered within the derrick.

A suitable pressure fluid, such as oil, is introduced into the body 16, which body serves as a reservoir or chamber for such fluid. For introducing the fluid from the reservoir into the tubing string under pressure, said body is formed with a radially extending boss 25 and a pressure pump P is supported in the upper end of this boss (Figures 2 and 3). A radially extending passage 26 extends from the interior of the lower portion of the reservoir to a vertical passage 27 which is formed within the boss 25. The lower portion of the vertical passage 27 communicates with the interior of the axial bore 20 of the nipple 18 through a lateral passage 28. With this arrangement, it will be seen that the fluid from the reservoir may flow through the passage 26, then downwardly through the passage 27 and finally through the lateral passage 28 into the bore 20 of the nipple 18, from where said fluid may flow into the tubing string 12. For controlling the flow through the passage 26, a spring-pressed ball check valve 29 is mounted within said passage being retained therein by a suitable nut 30, which is threaded into the enlarged outer end of the passage, as is clearly shown in Figure 3. Manifestly, fluid may flow from the reservoir to unseat the ball under tension of its spring; however, a back flow of fluid from the passage 27 into the reservoir is prevented by the ball check 29. A similar ball check valve 31 is mounted in the passage 27 and is retained therein by a nut 32 which is threaded into the outer enlarged end of the passage. The ball check 31 is arranged to permit a downward flow through the passage 27 while preventing an upward flow therethrough.

The pump P which is mounted in the upper end of the boss 25 includes a cylinder 33 which has its lower end threaded into a recess 34 formed in said boss. The lower end of the cylinder communicates through a port 35 with the radial passage 26 leading from the reservoir. An outer tubular piston 36 has a sliding fit within the cylinder 33 and the lower end of this piston has an annular packing cup 37 mounted thereon, said cup being retained by a retaining nut 38 threaded on a depending extension 36' formed integral with the piston. The upper end of the tubular piston 36 is provided with a pair of diametrically opposed arms 39 which extend upwardly from the piston and which span an operating lever 40. The operating lever is provided with a transverse opening 41 which is arranged to be alined with openings 42 in the upwardly extending arms 39 of the piston 36. A removable connecting or pivot pin 43 passes through the openings 42 and the opening 41, whereby the arms 39 are pivotally connected to the lever 40. One end of the lever is pivoted at 44 to the upper end of a supporting link 45, which link has its lower end pivoted to an ear 46 which is made integral with one side of the boss 25. Manifestly, when the free end of the operating lever 40 is swung on the pivot 44, the piston 36 is reciprocated vertically within the cylinder 33. It is noted that the mounting of the lever 40 by means of the pivoted link 45 permits the lever to undergo a lateral movement so as to maintain the vertical alinement of the piston 36 and the cylinder 33.

An inner or smaller piston 47, which is solid in cross-section, is mounted to reciprocate within the bore 36a of the outer tubular piston 36. The lower end of the inner piston has a suitable flexible packing cup 48 secured thereto. The upper end of said inner piston projects upwardly from the bore of the tubular piston 36 and has a suitable packing gland 49 surrounding the same. An upwardly extending lug 50 is formed on the inner piston and this lug is adapted to engage between depending ears 51 which are formed on the underside of the operating lever 40. A transverse pin 52 extends through the lug 50 and is suitably secured thereto, the outer ends of said pin engaging within arcuate slots 53 which are formed in the ears 51. With this arrangement, it will be obvious that a connection is set up between the operating lever 40 and the inner piston 47 by means of the pin 52 and slots 53.

When both the inner and outer pistons are connected to the operating lever 40, as above described, the parts are in the position shown in Figure 3 and the swinging of the operating lever 40 will result in a reciprocation of the pistons as a unit. Therefore, since both pistons move simultaneously, the effect of a large piston having the same cross-sectional area as the interior of the cylinder 33 is had. As the lever 40 is swung to reciprocate the pistons, said lever moves laterally on its supporting link 45 so as to maintain the outer piston 36 in vertical alinement with the cylinder. Such lateral movement of the lever does not affect the vertical position of the inner piston 47 because of the arcuate slots 53, which are engaged by the pin 52.

When the operating lever 40 is swung to reciprocate the pistons 36 and 47 simultaneously, it will be evident that a pumping action draws the fluid from the reservoir 16 and forces the same outwardly through the passages 27 and 28 and into the tubing string. The relatively large piston formed by the two pistons connected together makes it possible to quickly introduce a relatively large volume of fluid into the tubing string. After sufficient fluid has been introduced into the tubing string, and it is desired to build up the pressure within said tubing string, it is desirable that a piston of small cross-sectional area be employed in order to easily build up such pressure. To accomplish this, it is only necessary to remove the pin 43, whereby the outer piston 36 is disconnected from the operating lever 40. The outer piston is then moved to its lowermost position as shown in Figure 4, whereby a pair of lugs 54 which are secured to the outer surfaces of the arms 39 may be moved downwardly through vertical recesses 55 provided in a lock collar 56. The lock collar is threaded onto the upper end of the cylinder 33 and has an annular groove 57 which communicates with the lower end of the vertical recesses 55. When the angular lugs 54 are moved downwardly through the vertical recesses 55, it is only necessary to rotate the lock nut 56, whereby the top of the annular groove 57 overlies the lugs 54, as shown in Figure 4. When the parts are in this position, it will be manifest that the outer piston 36 is locked in its lowered position. A suitable packing element 56' may be interposed between the collar 56 and the cylinder.

After the outer piston has been suitably locked, as explained, the operating lever 40 is then swung to reciprocate the inner piston 47 individually. The bore 36a of the outer piston 36 then becomes a cylinder, in which the smaller piston 47 reciprocates. Due to the smaller cross-sectional area of the piston 47, there is a less volume displacement but an increased pressure applied to the fluid. In this manner, it is possible to manually build up the pressure of the fluid which has been introduced into the tubing string to any desired pressure, as indicated by the gauge 24.

For relieving the pressure within the interior of the tubing string 12, a manually operated relief valve 58 is provided. This valve is threaded radially through the bottom 17 of the body 16 and has its inner end entering a relief port 59 which extends radially from the axial bore 20 of the nipple 18. An inclined port 60 extends from the port 59 through the bottom 17 and communicates with the bottom of the fluid reservoir. When the valve 58 is closed, the pressure within the tubing cannot escape and during the operation of the pump, said valve remains closed. When it is desired to release the pressure within the tubing string, it is only necessary to operate the valve 58, whereby the fluid within said tubing may flow through the ports 59 and 60 and back into the fluid reservoir.

In practicing the improved method, the usual tubing head (not shown) is removed from the upper end of the tubing string 12 and the testing device T is threaded into the uppermost collar 13 of the tubing string, as shown in Figure 1. At this time, substantially the entire tubing string 12 is filled with the well fluid which is retained therein by the standing valve 14. The pump pistons 36 and 47 are both connected to the operating lever 40 so that said pistons will be reciprocated simultaneously upon swinging of said lever. A suitable extension or handle 40a which may be a short section of pipe may be engaged over the outer end of the lever 40 to increase the leverage. The relief valve 58 is, of course, closed, after which the pump P is operated by swinging the lever 40. As the pistons 47 and 36 operate simultaneously to act as a single piston, the fluid is drawn from the reservoir past the check valve 29 and is then forced through the passages 27 and 28 past the check valve 31. Obviously, the fluid enters the upper sections of the tubing and when sufficient fluid has been introduced to build up sufficient pressure to compress any free gas within the tubing back into solution with the liquid, the outer piston 36 is disconnected and locked in its lowermost position, as shown in Figure 4. At this time, the pressure gauge 24 will, of course, register the pressure of the fluid within the tubing string.

After the outer piston has been disconnected from the operating lever and locked in its lowered position, a continued operation of the lever 40 will reciprocate the smaller piston 47 within the outer piston 36, whereby the pressure is built up within the tubing string. It is pointed out that by operating the pistons 47 and 36 simultaneously at the start, a large volume of fluid may be displaced which greatly speeds up the operation. After the fluid has been introduced into the string and the pressure is being built up, the smaller piston is employed. The pressure is registered by the gauge 24 and by noting said gauge the operator is advised of the pressure being built up in the tubing string as the pump P is operated. If the pressure continues to gradually increase as the pump continues to operate, this indicates that there is no leakage in the tubing string. However, if the pressure gauge reaches a predetermined point and it is impossible to build up the pressure beyond this point, then this indicates that there is a leak somewhere in the tubing string. For example, the pressure may build up to 400 pounds and continued operation of the pump will not permit said pressure to increase beyond this point. Manifestly, the failure of the pressure to increase is due to a leak in the string, which leak requires 400 pounds pressure before it opens up. At any pressure below this point, the point of leakage is closed. Therefore, it is possible by applying the device to the upper end of the string to determine whether or not there is a leak in said string without removing the tubing from the well.

Assuming that the presence of a leak has been discovered at some point in the string, the device T is removed from the uppermost section of the string and several sections are removed. After this is done, the testing device T is then replaced and connected to the upper end of the remainder of the tubing. The operation is again repeated as above and if the pressure does not build up beyond the 400 pounds at which it was halted on the previous operation, plus the number of pounds equivalent to the hydrostatic head of the fluid column within the removed sections, this immediately advises the operator that the leak is at some point in the remainder of the string and the method is repeated. However, if the pressure can be built up beyond 400 pounds plus the difference in hydrostatic head caused by removal of some of the tubing sections and continues to build up as the pump is operated, then the operator immediately knows that the leak is in some section which was removed. If the latter is the case, then the removed sections may be again connected in the string and tested individually as each is run into the hole by applying the testing device T, as has been explained. When the section wherein the leak is present has been determined, the usual elevators (not shown) may be engaged with the device T, whereby the section raised above the derrick floor while under internal pressure, whereby the leak may be visually observed.

From the above, it will be obvious that the tubing may be tested as it is being removed from or run into, the well and it is not necessary to individually test each section and each joint. Through the use of the device, it is possible to first determine whether or not a leak is present and second locate the leak by successive tests after the removal of one or more sections between each test period. Manifestly, the device may also be used for testing the standing valve 14, as well as the well pump (not shown) as those parts are pulled to the surface.

The device is simple in construction and is readily portable. It is easy to handle which facilitates the testing operation. The provision of the double piston pump makes it possible to first displace a large volume of fluid so as to force any free gas back into solution with the liquid in the string, whereby the time required for each test is materially reduced. After sufficient fluid has been introduced, the smaller piston may be operated individually so that the desired high pressure may be built up through manual operation. Although the device has been described and shown as testing the well tubing as it is removed from the well, it is obvious that said device may be employed for individually testing sections of pipe or other conductors.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A testing device including, an annular body having an open top forming a fluid reservoir, means for mounting the body on a fluid conductor, said body having a passage establishing communication between the reservoir and the conductor, means mounted on the body for forcing the fluid from the reservoir into the conductor under pressure so as to subject said conductor to such pressure, a tubular pipe extending axially of the body and having its lower end communicating with the bore of the conductor, a pressure gauge mounted on the closed top of the pipe for indicating the pressure conditions therein, and a manually operated relief valve for releasing the fluid under pressure from the conductor.

2. A testing device including, an annular body having an open top and an axial opening in its bottom and forming a fluid reservoir, a connecting nipple surrounding the opening an depending therefrom, said nipple being arranged to be connected to the upper end of a fluid conductor, an angular passage extending from the lower portion of the reservoir to the bore of the nipple, means mounted on the body and communicating with the passage for forcing fluid from the reservoir into the conductor under pressure, closure means for the opening in the bottom of the reservoir, and a pressure gauge mounted in said closure for indicating the pressure conditions within the nipple and conductor.

3. A testing device including, an annular body having an open top and an axial opening in its bottom and forming a fluid reservoir, a connecting nipple surrounding the opening and depending therefrom, said nipple being arranged to be connected to the upper end of a fluid conductor, an angular passage extending from the lower portion of the reservoir to the bore of the nipple, means mounted on the body and communicating with the passage for forcing fluid from the reservoir into the conductor under pressure, closure means for the opening in the bottom of the reservoir, a pressure gauge mounted in said closure for indicating the pressure conditions within the nipple and conductor, a by-pass extending from the bore of the nipple to the bottom of the reservoir, and manually operated means for controlling flow through the by-pass, whereby the pressure fluid may be released from the conductor to permit removal of the device from the conductor.

4. A testing device including, an annular body having an open top and an axial opening in its bottom and forming a fluid reservoir, a connecting nipple surrounding the opening and depending therefrom, said nipple being arranged to be connected to the upper end of a fluid conductor, an angular passage extending from the lower portion of the reservoir to the bore of the nipple, means mounted on the body and communicating with the passage for forcing fluid from the reservoir into the conductor under pressure, check valves mounted in the angular passage for permitting a flow in only one direction through said passage, closure means for the opening in the bottom of the reservoir, and a pressure gauge mounted in said closure for indicating the pressure conditions within the nipple and conductor.

5. A testing device including, an annular body having an open top and an axial opening in its bottom and forming a fluid reservoir, a connecting nipple surrounding the opening and depending therefrom, said nipple being arranged to be connected to the upper end of a fluid conductor, an angular passage extending from the lower portion of the reservoir to the bore of the nipple, means mounted on the body and communicating with the passage for forcing fluid from the reservoir into the conductor under pressure, check valves mounted in the angular passage for permitting a flow in only one direction through said passage, closure means for the opening in the bottom of the reservoir, a pressure gauge mounted in said closure for indicating the pressure conditions within the nipple and conductor, a by-pass extending from the bore of the nipple to the bottom of the reservoir, and manually operated means for controlling flow through the by-pass, whereby the pressure fluid may be released from the conductor to permit removal of the device from the conductor.

CARL H. BROWALL.